United States Patent
Miyoshi et al.

(10) Patent No.: US 9,184,439 B2
(45) Date of Patent: Nov. 10, 2015

(54) NEGATIVE-ELECTRODE ACTIVE MATERIAL FOR NON-AQUEOUS-SYSTEM SECONDARY BATTERY AND PRODUCTION PROCESS FOR THE SAME

(75) Inventors: Manabu Miyoshi, Kariya (JP); Hideaki Ishikawa, Kariya (JP); Hitotoshi Murase, Kariya (JP)

(73) Assignee: KABUSHIKI KAISHA TOYOTA JIDOSHA, Aichi (JP)

(*) Notice: Subject to any disclaimer, the term of this patent is extended or adjusted under 35 U.S.C. 154(b) by 574 days.

(21) Appl. No.: 13/516,974

(22) PCT Filed: Dec. 8, 2010

(86) PCT No.: PCT/JP2010/007143
§ 371 (c)(1),
(2), (4) Date: Jun. 18, 2012

(87) PCT Pub. No.: WO2011/077654
PCT Pub. Date: Jun. 30, 2011

(65) Prior Publication Data
US 2012/0258370 A1    Oct. 11, 2012

(30) Foreign Application Priority Data
Dec. 21, 2009  (JP) .................. 2009-288897

(51) Int. Cl.
*H01M 4/58* (2010.01)
*H01M 4/36* (2006.01)
(Continued)

(52) U.S. Cl.
CPC .............. *H01M 4/364* (2013.01); *C01B 33/24* (2013.01); *H01M 4/386* (2013.01); *H01M 4/485* (2013.01); *H01M 4/62* (2013.01); *H01M 10/052* (2013.01)

(58) Field of Classification Search
USPC ....................................... 429/231.6
See application file for complete search history.

(56) References Cited

U.S. PATENT DOCUMENTS 5,395,711 A * 3/1995 Tahara et al. ............. 429/332
6,042,969 A * 3/2000 Yamada et al. .......... 429/218.1
(Continued)

FOREIGN PATENT DOCUMENTS

CN    101076906 A    11/2007
CN    101533907 A    9/2009
(Continued)

OTHER PUBLICATIONS

Office Action dated Mar. 19, 2014, issued by the State Intellectual Property Office of the P.R.C. in corresponding Chinese Application No. 201080060349.4.
(Continued)

*Primary Examiner* — Patrick Ryan
*Assistant Examiner* — Lucas J O'Donnell
(74) *Attorney, Agent, or Firm* — Sughrue Mion, PLLC

(57) ABSTRACT

Providing a noble negative-electrode active material including silicon, and a production process for the same.
A negative-electrode active material for non-aqueous-system secondary battery including a silicon phase and a composite oxide phase (a $CaSiO_3$ phase, for instance) is obtained by mixing a silicon oxide (SiO, for instance) with a silicon compound ($CaSi_2$, for instance), which includes silicon and at least one member of elements being selected from the group consisting of Group 2 (or Group 2A) elements in the Periodic Table, to prepare a mixed raw material, and then reacting the mixed raw material. The composite oxide phase demonstrates the advantage of inhibiting electrolytic solutions from decomposing in a smaller amount than does the conventional $SiO_2$ phase.

9 Claims, 7 Drawing Sheets

(51) Int. Cl.
*C01B 33/24* (2006.01)
*H01M 4/38* (2006.01)
*H01M 4/485* (2010.01)
*H01M 4/62* (2006.01)
*H01M 10/052* (2010.01)

(56) References Cited

U.S. PATENT DOCUMENTS

| | | | | |
|---|---|---|---|---|
| 8,062,561 B2 * | 11/2011 | Jumas et al. | ............. | 252/519.54 |
| 2001/0016281 A1 * | 8/2001 | Ito | ............... | 429/218.1 |
| 2005/0186475 A1 | 8/2005 | Jeong et al. | | |
| 2007/0020520 A1 * | 1/2007 | Ugaji | ......................... | 429/218.1 |
| 2008/0003502 A1 * | 1/2008 | Jumas et al. | ............... | 429/218.1 |
| 2009/0075173 A1 | 3/2009 | Jeong et al. | | |

FOREIGN PATENT DOCUMENTS

| | | |
|---|---|---|
| JP | 2005-259697 A | 9/2005 |
| JP | 2007-59213 A | 3/2007 |
| JP | 2008-508670 A | 3/2008 |
| JP | 2009-70825 A | 4/2009 |
| JP | 2009289680 A | 12/2009 |
| JP | 2010-170943 A | 8/2010 |

OTHER PUBLICATIONS

Japanese Notification of Reasons for Refusal issued in Japanese Patent Application No. 2011-547272 dated Jun. 13, 2013.

Communication dated May 15, 2015, issued by the European Patent Office in counterpart Application No. 10838894.3.

* cited by examiner

NEGATIVE-ELECTRODE ACTIVE MATERIAL FOR NON-AQUEOUS-SYSTEM SECONDARY BATTERY AND PRODUCTION PROCESS FOR THE SAME

CROSS REFERENCE TO RELATED APPLICATIONS

This application is a National Stage of International Application No. PCT/JP2010/007143, filed on Dec. 8, 2010, which claims priority from Japanese Patent Application No. 2009-288897, filed on Dec. 21, 2009, the contents of all of which are incorporated herein by reference in their entirety.

TECHNICAL FIELD

The present invention is one which relates to a non-aqueous-system secondary battery such as lithium-ion secondary batteries. In particular, it is one which relates to an active material for non-aqueous-system secondary battery.

BACKGROUND ART

Secondary batteries, such as lithium-ion secondary batteries, have been used in a wide variety of fields like cellular phones and notebook-size personal computers, because they are compact and have large capacities. A lithium-ion secondary battery has active materials, which can insert lithium (Li) thereinto and eliminate it therefrom, for the positive electrode and negative electrode, respectively. And, it operates because the Li ions migrate within an electrolytic solution that is disposed between both the electrodes.

The performance of secondary battery is dependent on materials for the positive electrode and negative electrode as well as the electrolyte that constitute the secondary battery. Even among them, the research and development of active-material ingredients that form active materials have been carried out actively. For example, employing silicon oxide (e.g., $SiO_x$: "x" is $0.5 \leq$ "x" $\leq 1.5$ approximately) has been investigated. It has been known that $SiO_x$ decomposes into Si and $SiO_2$ when being heat treated. This is called a disproportionation reaction; when being homogenous solid silicon monoxide, SiO, in which the ratio between Si and O is 1:1 roughly, it separates into two phases, an Si phase and $SiO_2$ phase, due to the internal reaction in the solid. The Si phase, which is obtainable by the separation, is fine extremely. Moreover, the $SiO_2$ phase, which covers the Si phase, possesses an action of inhibiting electrolytic solutions from decomposing. Therefore, a secondary battery, which uses a negative-electrode active material being made by decomposing $SiO_x$ into Si and $SiO_2$, is good in terms of cyclability.

As a specific example for such a negative-electrode active material, a nano composite body, which includes Si, $SiO_2$ and a metallic oxide, is disclosed in Patent Literature No. 1. In Example No. 3, a composite body with $Si:SiO_2:CaO=9:3:1$ is obtained by heat treating SiO (e.g., a mixture with $Si:SiO_2=1:1$) and calcium (Ca) at 900° C. for 6 hours in an argon gas atmosphere after mixing them in a molar ratio of 2:1.

Moreover, in Example No. 1 of Patent Literature No. 2, a composite body, in which B is doped into $SiO_{1.48}$, is obtained by cooling $SiO_2$, Si and $B_2O_3$ rapidly after subjecting them to a depressurized heat treatment at 800° C.

RELATED TECHNICAL LITERATURE

Patent Literature

Patent Literature No. 1: Japanese Unexamined Patent Publication (KOKAI) Gazette No. 2009-70, 825; and Patent Literature No. 2: Japanese Unexamined Patent Publication (KOKAI) Gazette No. 2005-259, 697

DISCLOSURE OF THE INVENTION

Assignment to be Solved by the Invention

However, when $SiO_2$ is included in a negative-electrode active material, it has been known that the resulting initial charging/discharging efficiency gets worse. This is because, in a case where $SiO_2$ occludes lithium ions, for example, it forms a stable compound (e.g., $Li_4SiO_4$) so that the lithium ions become less likely to be released, and then comes to exhibit an irreversible capacity. However, when reducing a proportion of the $SiO_2$ phase, even the aforementioned advantage of inhibiting electrolytic solutions from decomposing, which results from the $SiO_2$ phase, has also been reduced, so the resultant cyclabilities worsen. Consequently, a noble silicon-oxide-system negative-electrode active material replacing the conventional negative-electrode active materials that mainly include an Si phase and an $SiO_2$ phase, and a production process for the same have been sought for.

In view of the aforementioned problematic issues, the present invention aims at providing a noble negative-electrode active material including silicon, and a production process for the same.

Means for Solving the Assignment

The present inventors focused on the fact that a composite oxide phase with M-Si—O system (hereinafter abbreviated to as "M-Si—O phase," wherein "M" is a metallic element) also effects the advantage of inhibiting electrolytic solutions from decomposing. And, as a result of their earnest studies, it was understood that the M-Si—O phase demonstrates the advantage of inhibiting electrolytic solutions from decomposing in a smaller amount than does the $SiO_2$ phase. By developing this achievement, the present inventors arrived at completing a variety of inventions being described hereinafter.

Specifically, a negative-electrode active material for non-aqueous-system secondary battery according to the present invention is characterized in that:

it at least includes a silicon phase as well as a composite oxide phase that includes silicon and at least one member of elements being selected from the group consisting of Group 2 (or Group 2A) elements in the Periodic Table.

Moreover, a production process for negative-electrode active material for non-aqueous-system secondary battery according to the present invention is characterized in that:

it is a production process for the aforementioned negative-electrode active material for non-aqueous-system secondary battery according to the present invention; and it includes:

a raw-material preparation step of preparing a mixed raw material at least including a silicon oxide, and a silicon compound that includes silicon and at least one member of elements being selected from the group consisting of Group 2 (or Group 2A) elements in the Periodic Table; and a reaction step of reacting said mixed raw material.

The negative-electrode active material for non-aqueous-system secondary battery according to the present invention mainly includes a silicon (Si) phase, and the aforementioned composite oxide phase. Such a negative-electrode active material for non-aqueous-system secondary battery is readily obtainable by reacting a silicon oxide with the abovementioned silicon compound. The composite oxide phase fully demonstrates the advantage of inhibiting electrolytic solutions from decomposing in a smaller amount than does the SiO$_2$ phase. Consequently, even when a proportion, for which the Si phase accounts in the negative-electrode active material, is augmented, the resulting cyclabilities are less likely to decline. Since it is possible to augment the proportion of the Si phase, and since it is not needed to include the SiO$_2$ phase, the resultant initial charging/discharging efficiency also upgrades.

Effect of the Invention

The negative-electrode active material for non-aqueous-system secondary battery according to the present invention mainly includes a silicone phase as well as a composite oxide phase that includes silicon and at least one member of elements being selected from the group consisting of Group 2 (or, Group 2A) elements in the Periodic Table. By employing such a negative-electrode active material for non-aqueous-system secondary battery, the initial charging/discharging efficiency of the resulting non-aqueous-system secondary battery can be upgraded without ever worsening the cyclabilities.

MODE FOR CARRYING OUT THE INVENTION

Figure 1:
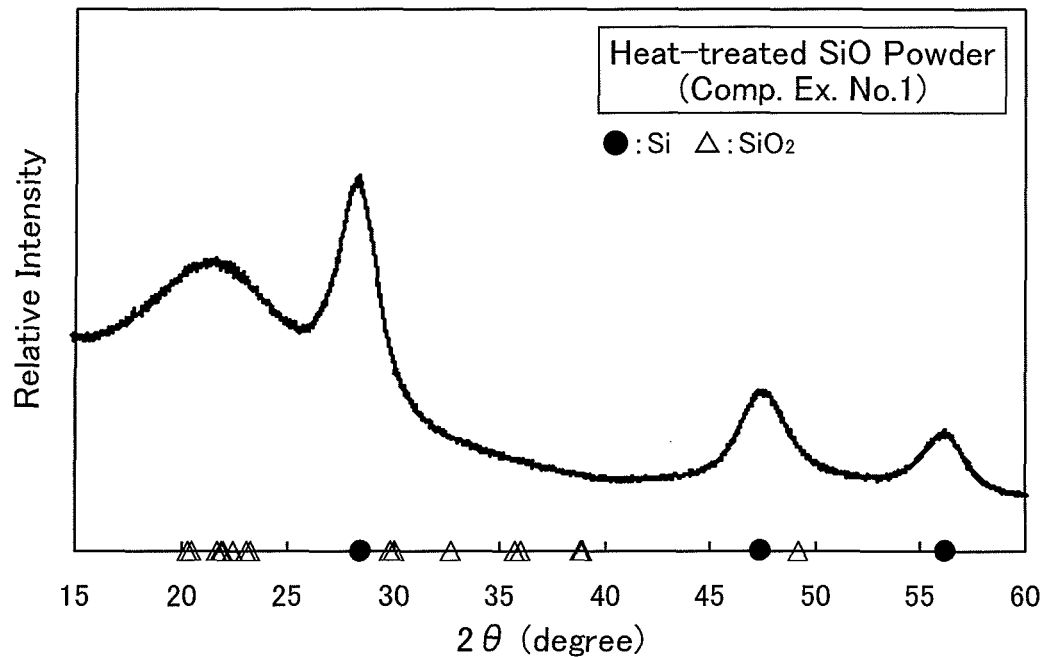
FIG. 1 is an X-ray diffraction diagram of a decomposed product that was obtained after causing silicon monoxide (SiO) to thermally decompose independently.

Hereinafter, explanations will be made on some of the best modes for performing the negative-electrode active material for non-aqueous-system secondary battery according to the present invention, and for the production process for the same. Note that, unless otherwise specified, ranges of numeric values, namely, "from 'p' to 'q'" being set forth in the present description, involve the lower limit, "p," and the upper limit, "q," in those ranges. Moreover, the other ranges of numeric values are comparable by arbitrarily combining any two of numeric values, which are set forth in the present description, within the ranges of those numeric values.

(Negative-electrode Active Material for Non-aqueous-system Secondary Battery and Production Process for the Same)

The production process for negative-electrode active material for non-aqueous-system secondary battery according to the present invention is a production process for the negative-electrode active material for non-aqueous-system secondary battery, negative-electrode active material which at least includes a silicon phase, and a composite oxide phase that includes silicon and at least one member of elements being selected from the group consisting of Group 2 (or Group 2A) elements in the Periodic Table. The present production process mainly includes a raw-material preparation step of preparing a mixed raw material, and a reaction step of reacting that mixed raw material. Hereinafter, each of the steps will be explained.

The raw-material preparation step is a step of preparing a mixed raw material that at least includes a silicon oxide and a silicon compound. An employable silicon oxide can preferably be represented by a compositional formula, SiO$_n$ (0.1≤"n"≤2). To be concrete, it involves silicon monoxide (SiO), silicon dioxide (SiO$_2$), and silicon oxides as well whose compositions deviate slightly from those of SiO and SiO$_2$. Moreover, it is also allowable that it can include a simple substance of silicon along with the silicon oxide. Moreover, the silicon compound includes silicon, and at least one element that is selected from the group consisting of Group 2 (or Group 2A) elements in the Periodic Table. Note that those of Group 2 of the Periodic Table belong to old Group 2A, respectively. It is possible to make it apparent by means of a "first principle calculation" being explained below that silicon compounds, which include one or more members of the Group 2 elements (namely, beryllium (Be), magnesium (Mg), calcium (Ca), strontium (Sr), barium (Ba), and radium (Ra)), are employable. In the following first principle calculation, an electron-sate calculation program, which is based on density functional theory using ultra soft pseudopotentials, was used as the calculation program. To the exchange/correlation energies that are necessary for the density functional theory, those to which the corrections of generalized density gradient (or Generalized-Gradient Approximation (i.e., GGA)) had been performed were applied. Note however that a calculation method to be employed is not one which is limited to the density functional theory, but can be methods that can predict the electron states of materials highly accurately by means of one of first principle calculations.

First principle calculations make it possible to find the crystalline structures or electron states of materials without referring to any experimental values. Although a formation energy (or ΔH) is found herein by means of the first principle calculation for a reaction equation: $xSiO_2+M_ySi_z \rightarrow aSi+b(M-Si-O)$, it has been known that the obtained values of ΔH do not exhibit any great difference from the experimental values. In Table 1, the following are given: the reaction equations for which the first principle calculation was carried out; and the values of ΔH found by means of the first principle calculation.

TABLE 1

| Type of "M" | $xSiO_2 + M_ySi_z \longrightarrow aSi + b(M\text{-}Si\text{-}O)$ | ΔH (kJ/mol·$O_2$) |
|---|---|---|
| Mg | $2SiO_2 + Mg_2Si \longrightarrow 2Si + Mg_2SiO_4$ | −139 |
| Ca | $1.5SiO_2 + CaSi_2 \longrightarrow 2.5Si + CaSiO_3$ | −75 |
|  | $1.5SiO_2 + CaSi \longrightarrow 1.5Si + CaSiO_3$ | −76 |
|  | $1.5SiO_2 + 0.5Ca_2Si \longrightarrow Si + CaSiO_3$ | −101 |
|  | $1.5SiO_2 + 0.2Ca_5Si_3 \longrightarrow 1.1Si + CaSiO_3$ | −95 |
| Sr | $1.5SiO_2 + SrSi_2 \longrightarrow 2.5Si + SrSiO_3$ | −79 |
|  | $1.5SiO_2 + SrSi \longrightarrow 1.5Si + SrSiO_3$ | −89 |
| Ba | $SiO_2 + BaSi \longrightarrow 0.5Ba_2SiO_4 + 1.5Si$ | −98 |
|  | $SiO_2 + BaSi_2 \longrightarrow 0.5Ba_2SiO_4 + 2.5Si$ | −75 |
| Fe | $SiO_2 + FeSi_2 \longrightarrow 0.5Fe_2SiO_4 + 2.5Si$ | 380 |

In the cases where $SiO_2$ and the silicon compound including Mg, Ca, Sr or Ba with Si were used as the raw materials, the values of ΔH were negative values. When being ΔH<0, reactions that follow the respective reaction equations occur. On the other hand, in the case where $SiO_2$ and $FeSi_2$ were used as the raw materials, the reaction being set forth in Table 1 does not occur because of being ΔH>0.

And, when a silicon phase (i.e., Si phase) and an M-Si-O phase (i.e., a composite oxide phase) are produced by reacting $SiO_2$ with $M_ySi_z$ (i.e., a silicon compound), it is expected that an Si phase and a composite oxide phase can be produced even by reacting SiO with a silicon compound.

Moreover, the value of ΔH is −28 kJ/mol·$O_2$ for such a reaction as "$SiO_2+CaO \rightarrow CaSiO_3$" that is supposed to incidentally occur when "M" is Ca in Table 1.

That is, when being silicon compounds including silicon and at least one member of elements that is selected from the group consisting of the Group 2 elements, preferably, Mg and alkali-earth metal elements (e.g., Ca, Sr, Ba, and Ra), it is possible to say that they are employable as the mixed raw material.

Note that, not being limited to the silicone oxides and silicon compounds that are set forth in the reaction equations of Table 1, it is possible to say that those are employable as the mixed raw material when they are silicon oxides and silicon compounds, which possess compositions whose formation energies (or ΔH) being found by means of the first principle calculation are negative values, and when they are mixed in molar ratios that make the resulting ΔH negative values.

Although it is allowable that the silicon compound can be a binary system compound like $CaSi_2$ that includes Si and Ca, for instance, it is even permissible that it can be one which is a ternary system or more. To be concrete, CaMgSi, $CaNi_2Si_2$, $CaCu_2Si_2$, and the like, are employable. However, calcium silicates, such as $CaSiO_3$, are excluded.

It is desirable that both of the silicon oxide and silicon compound can be powdery. In other words, it is allowable that the raw-material preparation step can be a step of preparing a mixed raw-material powder that includes a silicon-oxide-system powder including the silicon oxide, and a silicon-compound-system powder including the silicon compound. Prior to the raw-material preparation step, it is permissible to classify (or sieve) them to 50 μm or less, furthermore, to 35 μm or less, in the case of being a silicon oxide; or to 500 μm or less, furthermore, to 450 μm or less, moreover, to 50 μm or less, in the case of being a silicon compound. However, in a case where they are reacted by means of milling alone at the later-described reaction step, they become likely to make such a form that a silicon-compound-system powder adheres onto silicon-oxide-system particles so as to cover the surfaces of the particles by classifying them so that a silicon-oxide-system powder includes large particles more than does the silicon-compound-system powder. Therefore, when being expressed by their average particle diameters, it is allowable to set up such a relationship as (Average Particle Diameter of Silicon-oxide-system Powder)>(Average Particle Diameter of Silicon-compound-system Powder). To be concrete, it is permissible that a silicon-oxide-system powder can be classified (or sieved) to 50 μm or less, furthermore, to 35 μm or less; and that a silicon-compound-system powder can be classified (or sieved) to 30 μm or less, furthermore, to 20 μm or less.

A mixing proportion of the silicon oxide and silicon compound can be set up so that the silicon oxide and silicon compound are mixed while aiming at making a predetermined stoichiometric ratio that depends on their types. However, in order that unreacted silicon compound cannot be left over, it is allowable to mix the silicon oxide so that it can be included in a greater amount by molar ratio than is the silicon compound. When concretely defining a case where the silicon compound comprises Ca and Si, it is permissible that a molar ratio between the silicon oxide and the silicon compound can be (Silicon Oxide):(Silicon Compound)=from 1.5:1 to 7.5:1 or from 2:1 to 5:1, furthermore, from 2.5:1 to 3.5:1. Not that, in a case where a later-described heat treatment step is omitted, it can allowably be (Silicon Oxide):(Silicon Compound) =from 6:1 to 8:1, furthermore, from 6.5:1 to 7.5:1. From now on, explanations will be made while assuming that both of the silicon oxide and silicon compound are powdery.

In a case where a powder including silicon monoxide particles is employed as the silicon-oxide-system powder, it is also allowable that the powder including silicon monoxide particles can even be served as it is for the reaction step, or it is even permissible that a silicon-oxide-system powder including two phases, the $SiO_2$ phase and the Si phase, can even be produced while using the powder including silicon monoxide particles as a raw-material silicon oxide powder. In other words, it is also allowable that the production process for negative-electrode active material according to the present invention can further include a disproportionation step that is carried out before the raw-material preparation step, and by which a silicon-oxide-system powder, in which silicon monoxide of a raw-material silicon oxide powder including a silicon monoxide powder has been disproportionated into an $SiO_2$ phase and an Si phase, is obtained. In the disproportionation step, a disproportionation reaction proceeds, disproportionation reaction in which silicon monoxide (or $SiO_n$, wherein "n" is 0.5≤"n"≤1.5), a homogenous solid whose atomic ratio between Si and O is 1:1 roughly, separates into the two phases, an Si phase and an $SiO_2$ phase, by means of reactions inside the solid. That is, a silicon-oxide-system powder, which is obtainable after this disproportionation step, includes silicon-oxide-system particles that include an Si phase and an $SiO_2$ phase. In general, it is said that almost all of silicon monoxide disproportionates and then separates into the two phases at 800° C. or more under such circumstances where oxygen is cut off. To be concrete, a silicon-oxidesystem powder, which includes two phases with a non-crystalline $SiO_2$ phase and a crystalline Si phase, is obtainable by carrying out a heat treatment with respect to a raw-material silicon oxide powder including a non-crystalline silicon monoxide powder at from 800 to 1,200° C. for from 1 to 5 hours in an inert atmosphere such as in a vacuum or in an inert gas.

The reaction step is a step of reacting the mixed raw material. The reaction between silicon oxide and the aforementioned silicon compound proceeds by imparting energy thereto. As some of its examples, it is possible to name the following methods: heating the mixed raw material, milling the mixed raw material, and the like. Since the mixed raw material is simply heated in heat treatments, they are most convenient. In milling, it is said that not only the raw material is mixed but also atomic diffusions occur chemically at the interface between the solid phases along with finely pulverizing the particles. Consequently, a composite powder, which is obtainable by means of milling, takes on a form that is different from that of a simply mixed powder.

The production process for negative-electrode active material according to the present invention includes, as the reaction step, a milling step of performing milling onto the mixed raw-material powder, which includes a silicon-oxide-system powder and a silicon-compound-system powder, in an inert atmosphere. It is believed that, since mechanical energies are applied to the silicon-oxide-system powder and silicon-compound-system powder by means of the milling, not only they are pulverized finely but also their silicon oxide and silicon compound react at the interface between the solid phases. That is, a part of the mechanical energies in the milling contribute to the chemical atomic diffusion at the solid-phase interface between the silicon-oxide-system powder and the silicon-compound-system powder, thereby producing silicon compound phases and silicon phases, and the like.

In order to inhibit the raw-material powder from being oxidized or from undergoing unexpected reaction, it is allowable that the milling can be carried out in an inert gas atmosphere such as in an argon gas. Moreover, although it is believed that the diffusion can be facilitated by heating the raw-material powder during the milling, it is not necessary to heat it especially, so it is permissible to carry out the milling at room temperature.

In the milling step, it is allowable to mix the respective powders by making use of a type-V mixer, a ball mill, an attritor, a jet mill, a vibrational mill or a high-energy ball mill, and the like. This is desirable because not only the respective powders are mixed uniformly but also the resulting particles become much finer. When using a ball milling apparatus, it is desirable that the balls to be charged together with the raw-material powder can be made of zirconia, and it is allowable that they have a substantially sphere shape whose diameter is from 3 to 20 mm. Moreover, the milling conditions should be selected suitably according to the amount or type and the like of the raw-material power that undergoes the milling. However, if defining an extent of the milling daringly, it is desirable to carry out the milling until the silicon-oxide-system powder can be turned into being amorphous to such an extent that at least no definite diffraction peak of crystalline Si is detected, in a case where only the silicon-oxide-system powder, which includes crystalline silicon phases that have been produced by means of the disproportionation reaction, is subjected to an X-ray diffraction measurement after it has undergone the milling. If defining the milling conditions concretely, it is permissible that the number of revolutions of a container in the ball milling apparatus can be set at 500 rpm or more or 700 rpm or more, furthermore, at from 700 to 800 rpm, and that the mixing time can be set at from 10 to 50 hours.

By further performing a heat treatment onto the silicon-oxide-system powder and silicon-compound-system powder after the milling step, the reactions between them can be further facilitated. That is, by means of the heat treatment, the composite oxide phase increases. Moreover, in a case where a powder including silicon monoxide particles is employed as the silicon-oxide-system powder, it is also allowable to disproportionate the silicon monoxide by carrying out the heat treatment in order to increase the silicon phase. In a case where the heat treatment is done for the purpose of increasing the composite oxide phase at the heat treatment step, the reaction temperature should be set at the decomposition temperature of silicon oxide or more; to be concrete, it can be 800° C. or more, or from 800 to 1,200° C., furthermore, from 850 to 1,000° C. By retaining the mixed raw material in a desirable temperature range for 1.5 hours or more, or 3 hours or more, furthermore, from 5 to 7 hours, negative-electrode active materials for non-aqueous-system secondary battery are obtainable, negative-electrode active materials which include the silicon phase and composite oxide phase that have fine structures. When it is done for less than 1 hour, unreacted substances are likely to remain abundantly because the silicon oxide and the silicon compound do not react one another fully. The longer the retaining time is the more the fine silicon phase and composite oxide phase are produced; however, it can practically be 10 hours or less. Moreover, in a case where the heat treatment is done for the purpose of the disproportionation of silicon monoxide, it is permissible to carry out a treatment that is similar to the already-described disproportionation step; however, it is desirable to carry out a heat treatment at from 800 to 1, 100° C. for from 1 to 5 hours because the heat treatment results in producing crystalline silicon phases.

Although there are not any limitations especially on an atmosphere in the reaction step, it is allowable to carry out the reaction step in an inert atmosphere such as in a vacuum or in an argon gas, in order to inhibit composite powders from being oxidized or reacting unexpectedly. However, from the viewpoint of inhibiting the silicon phase and composite oxide phase from being oxidized excessively so that the resulting resistance becomes higher, it is preferable to carry out the reaction step in a vacuum, or in an inert gas atmosphere.

Note that, in the heat treatment step, it is allowable to just carry out a heat treatment mainly for the purpose of producing the composite oxide phase; however, as far as falling in a predetermined temperature range, it is even permissible to carry it out in parallel with another treatment such as a surface treatment for the surfaces of composite particles. For example, it is also allowable to carry out a CVD treatment that forms a carbon-system coating on the surfaces of composite particles. It is expected that the formation of carbon-system coating can result in upgrading the resulting electrical conductivity. Since not only the formation of carbon-system coating by means of CVD treatment is carried out in an atmosphere whose oxygen concentration is reduced but also composite powders become higher temperatures to a certain extent during the treatment, it becomes feasible to carry out the heat treatment step simultaneously with the CVD treatment.

By means of the production process being explained so far, negative-electrode active materials for non-aqueous-system secondary battery are obtainable, negative-electrode active materials which at least include a silicon phase, and a composite oxide phase including silicon and at least one member of elements that is selected from the group consisting of Group 2 (or Group 2A) elements in the Periodic Table, respectively. It is possible to ascertain the silicon phase and composite oxide phase by means of an X-ray diffraction (or XRD) measurement, for instance. When the silicon phase exists, the diffraction peak of (111) plane appears at around 2θ=28.5°. Moreover, when the composite oxide phase is a CaSiO$_3$ phase, the diffraction peak of (132) plane appears at around 2θ=27.6°.

The resulting negative-electrode active materials for non-aqueous-system secondary battery are obtainable with compositions and structures that depend on their making procedures and the types of raw-material powders. In a case where the silicon-oxide-system powder includes silicon monoxide particles, SiO phases remain unless it is exposed to such high temperatures as it is disproportionated during the production process. However, silicon monoxide can be disproportionated by disproportionating a silicon monoxide powder in advance and/or heat treating it at the reaction step, and thereby negative-electrode active materials including an Si phase and an SiO$_2$ phase are obtainable. Moreover, even when the silicon-oxide-system powder has any compositions, a composite oxide phase can be formed at the reaction step. Although the composite oxides are incrassated or concentrated onto the superficial layer of the secondary particles by the milling step alone, it is possible to assume that reactions proceed down to and around the center of the secondary particles to increase composite oxide phases by further carrying out a heat treatment after the milling.

Note that, since reaction products being obtainable after the reaction step might possibly be sintered to have massivated, it is also allowable to carryout a pulverizing operation after the reaction step. For the pulverization, it is permissible to employ the following: type-V mixers, ball mills, vibrational mills, high-energy ball mills, and the like. By pulverizing the reaction products, they come to have particle diameters that are suitable for making negative electrodes for non-aqueous-system secondary battery. It is even allowable to classify the reaction products after being pulverized to 20 μm or less, furthermore, to 5 μm or less, and then serve them for making negative electrodes.

(Negative Electrode for Non-Aqueous-System Secondary Battery)

Using the aforementioned negative-electrode active material for non-aqueous-system secondary battery, a negative electrode for non-aqueous-system secondary battery is made. A negative electrode for non-aqueous-system secondary battery mainly includes a negative-electrode active material, a conductive additive, and a binding agent that binds the negative-electrode active material and conductive additive together.

The negative-electrode active material is the aforementioned negative-electrode active material for non-aqueous-system secondary battery. Note that, on the condition that the aforementioned negative-electrode active material for non-aqueous-system secondary battery is made into a principal ingredient for the active material, it is also allowable to add other negative-electrode active materials (e.g., graphite, Sn, Si, and the like), which have been known already, thereto to use.

As for the conductive additive, it is allowable to use a material that has been used commonly in the electrodes of non-aqueous-system secondary battery. For example, it is preferable to use a conductive carbon material, such as carbon fibers and carbon blacks (or carbonaceous fine particles) like acetylene blacks, KETJENBLACK, and so on. In addition to these carbon materials, it is even permissible to use a conductive additive that has been known already, such as conductive organic compounds, as well. It is allowable to use one member of these independently, or to mix two or more of them to use. It is preferable that a blending proportion of the conductive additive can be the negative-electrode active material:the conductive additive=from 1:0.01 to 1:0.5 by mass ratio. This is because it is not possible to form any favorable electrically-conductive paths when the conductive additive is too less; moreover, that is because not only the formability of electrode gets worse but also an energy density of the resultant electrode becomes lower when the conductive additive is too much.

The binding agent is not one which is limited especially, and it is allowable to use those which have been known already. For example, it is possible to use resins, such as fluorine-containing resins like polytetrafluoroethyelene, polyvinylidene fluoride, and so on, which do not decompose even at high potentials. It is preferable that a blending proportion of the binding agent can be the negative-electrode active material: the binding agent=from 1:0.05 to 1:0.5 by mass ratio. This is because the formability of electrode declines when the binding agent is too less; moreover, that is because an energy density of the resultant electrode becomes lower when the binding agent is too much.

It is common that the negative-electrode active material is used in such a state it is press fitted onto a current collector as an active-material layer in a negative electrode. For the current collector, it is possible to use meshes being made of metal, or metallic foils. For example, it is allowable to use a current collector that comprises a copper, or a copper alloy, and the like.

There are not any limitations especially on a manufacturing process for the negative electrode, and it is allowable to follow a manufacturing process for electrode for non-aqueous-system secondary battery that has been practiced commonly. For example, the aforementioned conductive additive, and the aforementioned binding agent are mixed with the aforementioned negative-electrode active material, then an adequate amount of an organic solvent is added thereto, if needed, and thereby a pasty electrode mixture material is obtainable. This electrode mixture material is coated onto the surface of a current corrector, and is then press fitted thereon by carrying out pressing, and the like, if needed, after being dried. In accordance with this manufacturing process, an electrode being made becomes a sheet-shaped electrode. It is permissible to cut this sheet-shaped electrode to dimensions, which conform to specifications of non-aqueous-system secondary batteries to be made, to use.

(Non-Aqueous-System Secondary Battery)

A non-aqueous-system secondary battery is constituted of a positive electrode, the aforementioned negative electrode for non-aqueous-system secondary battery, and a non-aqueous electrolytic solution in which an electrolytic material is dissolved in an organic solvent. In addition to the positive electrode and negative electrode, this non-aqueous-system secondary battery is equipped with a separator, which is held between the positive electrode and the negative electrode, and the non-aqueous electrolytic solution, in the same manner as common secondary batteries.

The separator is one which separates the positive electrode from the negative electrode, and which retains the non-aqueous electrolytic solution. It is possible to use a thin microporous membrane, such as polyethylene or polypropylene, therefor.

The non-aqueous electrolytic solution is one in which an alkali metal salt, one of electrolytes, is dissolved in an organic solvent. There are not any limitations especially on the types of non-aqueous electrolytic solutions to be employed in non-aqueous-system secondary batteries that are equipped with the aforementioned negative electrode for non-aqueous-system secondary battery. As for the non-aqueous electrolytic solution, it is possible to use one or more members being selected from the group consisting of non-protonic organic solvents, such as propylene carbonate (or PC), ethylene carbonate (or EC), dimethyl carbonate (or DMC), diethyl carbonate (or DEC) and ethyl methyl carbonate (or EMC), for instance. Moreover, as for the electrolyte to be dissolved, it is possible to use alkali metal salts, such as $LiPF_6$, $LiBF_4$, $LiAsF_6$, LiI, $LiClO_4$, $NaPF_6$, $NaBF_4$, $NaAsF_6$ and LiBOB, which are soluble in organic solvents.

The negative electrode is one which has been explained already. The positive electrode includes a positive-electrode active material into which alkali metal ions can be inserted and from which they can be eliminated, and a binding agent that binds the positive-electrode active material together. It is also allowable that it can further include a conductive additive. The positive-electrode active material, the conductive additive, and the binding agent are not limited especially, and so it is permissible that they can be those which are employable in non-aqueous-system secondary batteries. To be concrete, as for the positive-electrode active material, the following can be given: $LiCoO_2$, $LiNi_{1/3}Co_{1/3}Mn_{1/3}O_2$, $Li_2MnO_2$, S, and the like. Moreover, it is allowable that a current collector can be those which are employed commonly for positive electrodes for non-aqueous-system secondary batteries, such as aluminum, nickel and stainless steels.

There are not any limitations on a configuration of the non-aqueous-system secondary battery, and hence it is possible to employ a variety of configurations, such as cylindrical types, laminated types and coin types. Even in a case where any one of the configurations is adopted, a battery is made as follows: the separators are interposed between the positive electrodes and the negative electrodes, thereby making electrode assemblies; and then these electrode assemblies are sealed in a battery case along with the non-aqueous electrolytic solution after connecting intervals to and from the positive-electrode terminals and negative-electrode terminals, which lead to the outside from the resulting positive-electrode current collectors and negative-electrode current collectors, with use of leads for collecting current, and the like.

So far, the embodiment modes of the negative-electrode active material for non-aqueous-system secondary battery according to the present invention, and those of the production process for the same have been explained. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, the present invention will be explained in detail while giving specific examples of the negative-electrode active material for non-aqueous-system secondary battery according to the present invention, and those of the production process for the same.

(Synthesis I for Negative-Electrode Active Materials)

Example No. 1-1

A heat-treated SiO powder, and a $CaSi_2$ powder (KO-JUNDO KAGAKU KENKYUJO Co., Ltd.) were made ready. Note that, in order to obtain the heat-treated SiO powder, an amorphous SiO powder (SIGMA-ALDRICH JAPAN Co., Ltd.) was disproportionated by heat treating it at 1,100° C. for 5 hours in a vacuum.

After the heat-treated SiO powder, and the $CaSi_2$ powder were classified to 31 μm or less, and to 15 μm or less, respectively, the heat-treated SiO powder, and the $CaSi_2$ powder were weighed out in an amount of 3.81 g, and in an amount of 1.19 g, respectively, thereby obtaining a raw-material powder that included the heat-treated SiO powder and the $CaSi_2$ powder in a ratio of 7:1 (by molar ratio).

5 g of the raw-material powder was charged into a container (with 45-c.c. capacity) being made of $ZrO_2$, container which held balls being made of $ZrO_2$ and having φ 12 mm in a quantity of 100 pieces therein, and was milled with use of a planetary-type ball mill ("P-7" produced by FRITSCH JAPAN Co., Ltd.), thereby obtaining a composite powder (i.e., Negative-electrode Active Material #11). The milling was carried out in an argon gas for 10 hours while setting the container's number of revolutions at 700 rpm.

Example No. 1-2

Except that an untreated amorphous SiO powder, onto which no disproportionation treatment was performed, was used instead of the heat-treated SiO powder, a composite powder (i.e., Negative-electrode Active Material #12) was obtained in the same manner as Example No. 1-1.

Comparative Example No. 1

The aforementioned heat-treated SiO powder was labeled Negative-electrode Active Material #C1.

Comparative Example No. 2

Only the aforementioned heat-treated SiO powder (5 g) was milled under the same milling conditions as those in Example No. 1-1, thereby obtaining Negative-electrode Active Material #C2.

The production conditions for the respective examples and comparative examples are given in Table 2.

TABLE 2

| Negative-electrode Active Material | | Composition of Mixed Raw Material | Milling Conditions | Heat Treating Conditions | After-reaction Pulverizing Conditions | Notes |
|---|---|---|---|---|---|---|
| Comp. Ex. No. 1 | #C1 | SiO | None | 1,100° C. for 5 hours | None | — |
| Comp. Ex. No. 2 | #C2 | SiO | 700 rpm for 10 hours | 1,100° C. for 5 hours | None | #C1 was milled |

TABLE 2-continued

| Negative-electrode Active Material | | Composition of Mixed Raw Material | Milling Conditions | Heat Treating Conditions | After-reaction Pulverizing Conditions | Notes |
|---|---|---|---|---|---|---|
| Ex. No. 1-1 | #11 | 7SiO + CaSi$_2$ | 700 rpm for 10 hours | None | None | #C1 was employed |
| Ex. No. 1-2 | #12 | 7SiO + CaSi$_2$ | 700 rpm for 10 hours | None | None | Untreated SiO was employed |

(X-Ray Diffraction Measurement)

Figure 2:
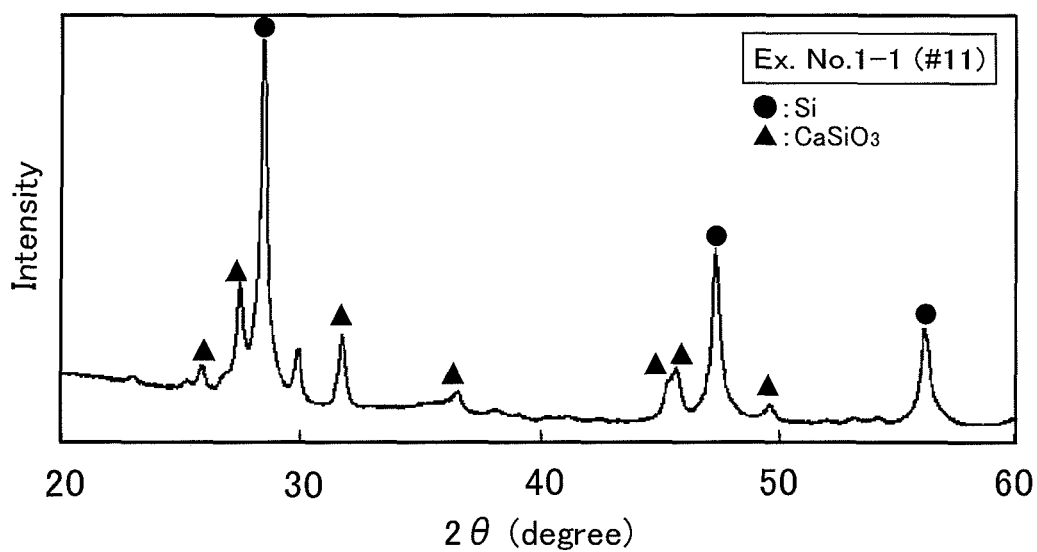
FIG. 2 is an X-ray diffraction diagram of a reaction product that was obtained by subjecting SiO and CaSi$_2$ to a heat treatment (e.g., a CVD treatment) after mixing them in a molar ratio of 7:1 and then subjecting them to milling.

For a powder for which a CVD treatment was carried out with respect to the composite powder (i.e., Negative-electrode Active Material #11) that was obtained in Example No. 1-1, an XRD measurement employing CuKα was carried out. Moreover, in order to make a comparison with the raw-material powder before being milled, a similar measurement was carried out for Heat-treated SiO Powder #C1 as well that had been used as one of the raw materials. The results are illustrated in FIG. 1 and FIG. 2. Note that the marks, ●, ▲ and Δ, shown in FIG. 1 and FIG. 2 indicate the peak positions of Si, CaSiO$_3$ and SiO$_2$ that were calculated from their lattice spacings d set forth in the ASTM card.

From FIG. 1, it was ascertained that the heat-treated SiO powder according to Comparative Example No. 1 was decomposed into two phases, namely, an amorphous SiO$_2$ phase and a fine crystalline Si phase, by means of the disproportionation reaction. Moreover, since the peaks indicating the presence of Si phase and CaSiO$_3$ phase were seen in FIG. 2, it was understood that an Si phase and a CaSiO$_3$ phase were produced by means of the milling. Moreover, though not illustrated in the drawings, since the peaks of Si and CaSiO$_3$ were ascertained also in the XRD measurement results on #11 and #12, it is believed that the following reactions progressed in the comparative examples and examples.

Comparative Example Nos. 1 and 2

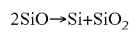
$2SiO \rightarrow Si + SiO_2$

Example No. 1-1

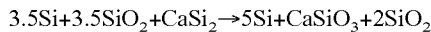
$3.5Si + 3.5SiO_2 + CaSi_2 \rightarrow 5Si + CaSiO_3 + 2SiO_2$

Example No. 1-2

$7SiO + CaSi_2 \rightarrow 4Si + 4SiO + CaSiO_3$ (Manufacture I for Negative Electrodes for Lithium Secondary Battery)

Electrodes (i.e., negative electrodes) were manufactured using any of the aforementioned negative-electrode active materials.

A mixed powder was obtained by mixing one of the negative-electrode active materials (i.e., the composite powders) with KETJENBLACK (or KB) serving as a conductive additive. Moreover, a polyamide-imide-silica hybrid resin serving as a binding agent was dissolved in N-methylpyrrolidone (or NMP). Note that the polyamide-imide-silica hybrid resin was produced by ARAKAWA CHEMICAL INDUSTRIES, LTD.; had a solvent composition of NMP/xylene=4/1; had cured residuals in an amount of 30.0%; had silica in an amount of 2% in the cured residuals (note that the proportions are all given by mass ratio); and exhibited a viscosity of 8,700 mPa·s at 25° C. This solution was mixed with a mixed power of the composite powder and KB, thereby preparing a slurry.

A blending ratio between the negative-electrode active material, KB and the binding agent (the solid content) was 80.75:4.25:15 by mass ratio. The prepared slurry was coated onto a surface of an electrolytic copper foil (i.e., a current collector) with 18-μm thickness using a doctor blade, thereby forming a negative-electrode active-material layer on the copper foil. Thereafter, the negative-electrode active-material layer was dried at 80° C. for 20 minutes, thereby evaporating the NMP to remove it from the negative-electrode active material layer. After the drying, the current collector and the negative-electrode active-material layer were adhered closely and are then joined firmly by means of a roll pressing machine.

This one was heat cured at 200° C. for 2 hours, thereby making it into an electrode whose active-material layer's thickness was 15 μm approximately.

(Manufacture I for Lithium Secondary Batteries)

While using the electrode being manufactured by the aforementioned procedure as an electrode to be evaluated, a lithium secondary battery (or a half cell) was manufactured. Metallic lithium (with 500-μm thickness) was made into the counter electrode. The counter electrode was cut to φ13 mm, the electrode to be evaluated was cut to φ11 mm, and then a separator (e.g., CELGARD 2400, a glass filter produced by HOECHST CELANESE Corporation) was interposed between the two, thereby making an electrode-assembly battery. This electrode-assembly battery was accommodated in a battery case (e.g., CR2032, a coin cell produced by HOHSEN Co., Ltd.). Moreover, a non-aqueous electrolyte, in which LiPF$_6$ was dissolved in a concentration of 1 M into a mixed solvent in which ethylene carbonate and diethyl carbonate were mixed in a volumetric ratio of 1:1, was injected into the battery case. The battery case was sealed hermetically, thereby obtaining each of lithium secondary batteries (i.e., "C1," "C2," "A1," and "A2").

(Charging/Discharging Characteristics I on Lithium Secondary Batteries)

A charging/discharging test was carried out with respect to four kinds of the thus manufactured lithium secondary batteries, thereby evaluating their initial charging/discharging efficiencies and cyclabilities.

In the charging/discharging test, the discharging operation was carried out up to a discharge cutoff voltage of 2 V with a constant current of 0.05 mA after the charging operation was carried out down to a charge cutoff voltage of 0.01 V with a constant current of 0.05 mA on the basis of metallic Li in a temperature environment of 25° C. The "charging" is a direction in which the active material of the electrode to be evaluated occludes Li, whereas the "discharging" is another direction in which the active material of the electrode to be evaluated releases or emits Li.

Figure 3:
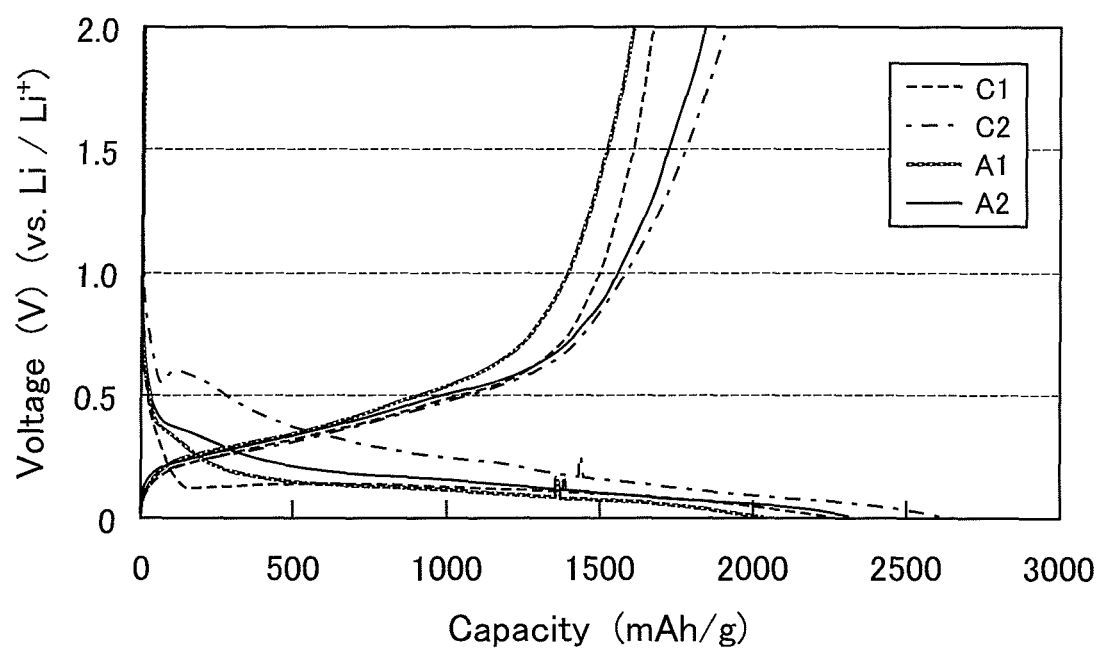
FIG. 3 illustrates charging/discharging curves of lithium secondary batteries being equipped with negative electrodes that included negative-electrode active materials for non-aqueous-system secondary battery according to the present invention.

The charging/discharging curves are illustrated in FIG. 3. Initial charging capacities, initial discharging capacities at 1 V, and initial discharging capacities at 2V were read out from FIG. 3, and then initial charging/discharging efficiencies were calculated. Note that an "initial charging/discharging efficiency" is a value being found as a percentage value that is obtained by dividing an "initial discharged capacity" by an "initial charged capacity" (i.e., {(Initial Discharged Capacity)/(Initial Charged Capacity)}×100).

In evaluating the cyclabilities, from the first cycle to the fifth cycle, the charging/discharging operations were carried out repeatedly in which the discharging operation was carried out up to a discharge cutoff voltage of 2 V with a constant current of 0.05 mA after the charging operation was carried out down to a charge cutoff voltage of 0.01 V with a constant current of 0.05 mA on the basis of metallic Li in a temperature environment of 25° C. Subsequently, the charging/discharging operations were carried out repeatedly while setting the constant current at 0.1 mA from the sixth cycle to the tenth cycle; at 0.2 mA from the eleventh cycle to the fifteenth cycle; and at 0.05 mA from the sixteenth cycle to the twentieth cycle. The cutoff voltages of the charging and discharging were set at from 0.01 to 2 V in any of the cycles.

Figure 4:
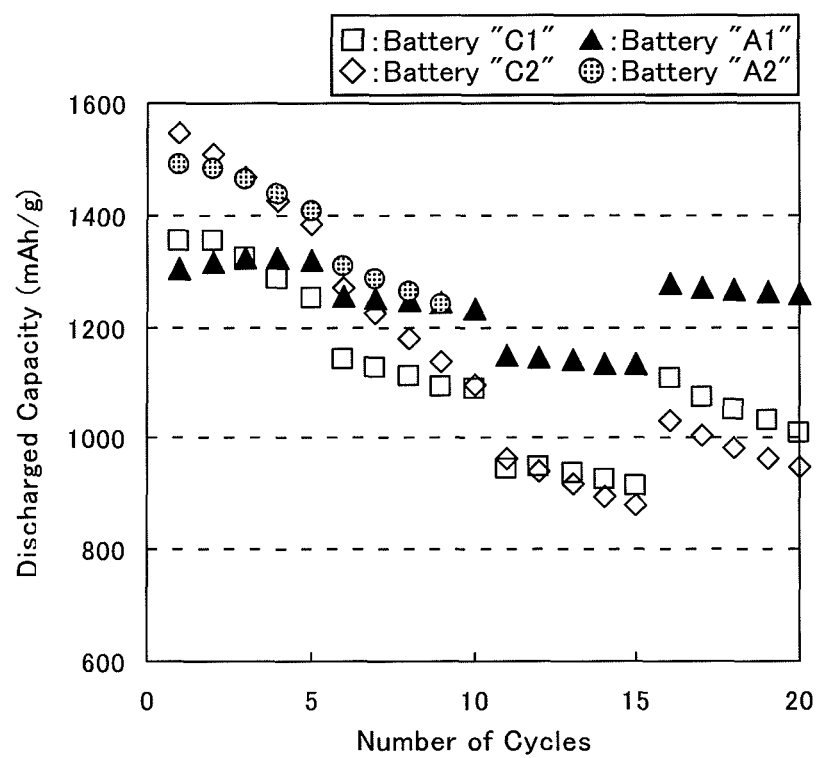
FIG. 4 is a graph that illustrates one of cyclabilities of the lithium secondary batteries being equipped with the negative electrodes that included the negative-electrode active materials for non-aqueous-system secondary battery according to the present invention, and shows their discharging capacities at each cycle.
Figure 5:
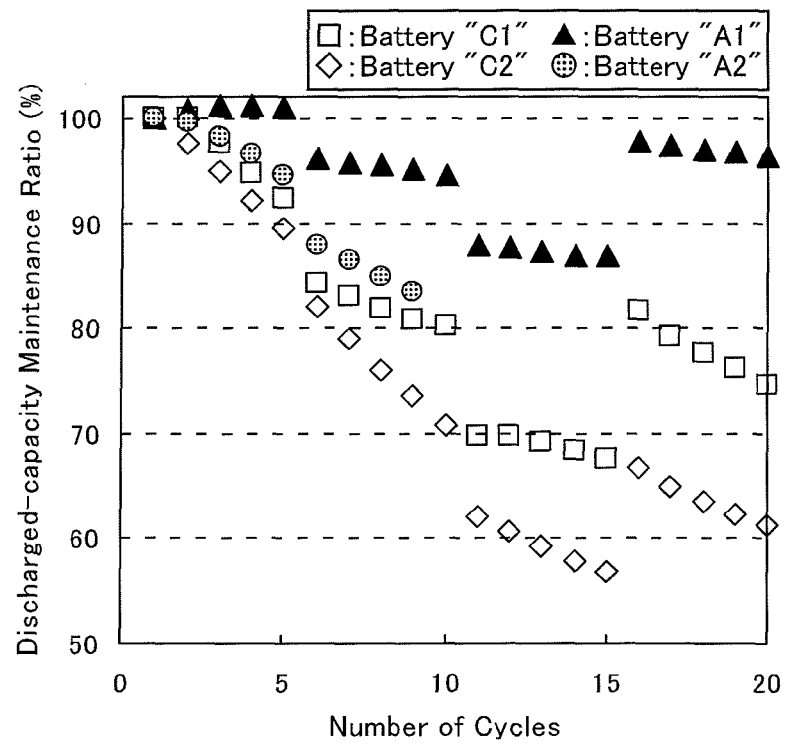
FIG. 5 is a graph that illustrates another one of cyclabilities of the lithium secondary batteries being equipped with the negative electrodes that included the negative-electrode active materials for non-aqueous-system secondary battery according to the present invention, and shows their discharged-capacity maintenance ratios.

The discharged capacities at the respective cycles are illustrated in FIG. 4, and the discharged capacity maintenance ratios at the respective cycles are illustrated in FIG. 5, respectively. Note that a "discharged capacity maintenance ratio" is a value being found as a percentage value that is obtained by dividing a "discharged capacity of an Nth cycle" by a "discharged capacity of 1st time" (i.e., {(Discharged Capacity at Nth Cycle)/(Discharged Capacity at 1st Cycle)}×100). "N" is an integer of from 1 to 20.

TABLE 3

| Lithium Secondary Battery | Negative-electrode Active Material | Initial Charged Capacity (mAh/g) | Initial Discharged Capacity (mAh/g) | | Initial Charging/Discharging Efficiency (%) | |
|---|---|---|---|---|---|---|
| | | | 1 V | 2 V | 0.01-1 V | 0.01-2 V |
| C1 | #C1 | 2241 | 1498 | 1680 | 66.8 | 75.0 |
| C2 | #C2 | 2612 | 1587 | 1921 | 60.7 | 73.5 |
| A1 | #11 | 2034 | 1391 | 1613 | 68.4 | 79.3 |
| A2 | #12 | 2315 | 1560 | 1847 | 67.4 | 79.8 |

Lithium Secondary Batteries "A1" and "A2" were good in both of the initial charging/discharging efficiency and the cyclability. Moreover, Lithium Secondary Battery "C1" was better than Lithium Secondary Battery "C2" in the initial charging/discharging efficiency, and in the cyclability. That is, it was understood that, when the heat-treated SiO powder is milled, the resulting initial charging/discharging efficiency and cyclability decline because the energy resulting from the milling has an influence on the structure of the Si phase that takes part in the occlusion/release of Li. However, Lithium Secondary Battery "A1," which was made using the negative-electrode active material labeled #11 that was obtained by milling the heat-treated SiO powder (i.e., #C1) along with the $CaSiO_2$ powder, exhibited the good initial charging/discharging efficiency and cyclability. That is, it was possible to assume that, in the making of #11, the energy of the milling hardly acted on the Si phase, but was consumed by the reaction between $SiO_2$ in the heat-treated SiO powder and $CaSi_2$ in the $CaSi_2$ powder.

(Synthesis II for Negative-Electrode Active Materials)

Example No. 2-1

An SiO powder (SIGMA-ALDRICH JAPAN Co., Ltd.), and a $CaSi_2$ powder (KO-JUNDO KAGAKU KENKYUJO Co., Ltd.) were made ready. After the SiO powder, and the $CaSi_2$ powder were classified to 45 μm or less, and to 425 μm or less, respectively, the SiO powder, and the $CaSi_2$ powder were weighed out in an amount of 2.89 g (0.066 mol), and in an amount of 2.11 g (0.022 mol), respectively, they were mixed with use of a planetary-type ball mill ("P-7" produced by FRITSCH JAPAN Co., Ltd.) at a revolving speed of 700 rpm for 50 hours, thereby preparing a mixed raw material.

In order to further react the SiO powder with the $CaSi_2$ powder, the obtained mixed raw material was kept at 900° C. for 2 hours in an argon gas atmosphere. Thereafter, the heated mixed raw material was stood to cool, thereby obtaining a reaction product. This reaction product was labeled #21.

Example No. 2-2

Except that the mixing conditions were set at 700 rpm for 74 hours and the reaction conditions were set at 900° C. for 6 hours, Reaction Product #22 was obtained in the same manner as Example No. 2-1. This reaction product was pulverized at a revolving speed of 700 rpm for 10 hours with use of the aforementioned planetary-type ball mill.

Example No. 2-3

The aforementioned SiO powder, and the aforementioned $CaSi_2$ powder were weighed out in an amount of 3.23 g (0.073 mol), and in an amount of 1.77 g (0.018 mol), respectively, and then they were mixed with use of a planetary-type ball mill ("P-7" produced by FRITSCH JAPAN Co., Ltd.) at a revolving speed of 700 rpm for 50 hours, thereby preparing a mixed raw material.

In order to further react the SiO powder with the $CaSi_2$ powder, the obtained mixed raw material was kept at 900° C. for 6 hours in an argon gas atmosphere. Thereafter, the heated mixed raw material was stood to cool, thereby obtaining a reaction product. This reaction product was labeled #23. This reaction product was pulverized at a revolving speed of 700 rpm for 10 hours with use of the aforementioned planetary-type ball mill.

Example No. 2-4

Except that the mixing proportion for the mixed raw material was altered as follows: 2.39 g (0.054 mol) for the SiO powder; and 2.61 g (0.027 mol) for the $CaSi_2$ powder, Reaction Product #24 was obtained in the same manner as Example No. 2-3. This reaction product was pulverized at a revolving speed of 700 rpm for 10 hours with use of the aforementioned planetary-type ball mill.

Comparative Example No. 3

Only the aforementioned SiO powder was heat treated at 900° C. for 2 hours, thereby obtaining a reaction production according to #C3.

The production conditions for the respective examples and comparative example are given in Table 4.

TABLE 4

| Negative-electrode Active Material | | Composition of Mixed Raw Material | Milling Conditions | Heat Treating Conditions | After-reaction Pulverizing Conditions | Notes |
|---|---|---|---|---|---|---|
| Comp. Ex. No. 3 | #C3 | SiO | None | 900° C. for 2 hours | None | — |
| Ex. No. 2-1 | #21 | $3SiO + CaSi_2$ | 700 rpm for 50 hours | 900° C. for 2 hours | None | Untreated SiO was employed |
| Ex. No. 2-2 | #22 | $3SiO + CaSi_2$ | 700 rpm for 74 hours | 900° C. for 6 hours | 700 rpm for 10 hours | Untreated SiO was employed |
| Ex. No. 2-3 | #23 | $4SiO + CaSi_2$ | 700 rpm for 50 hours | 900° C. for 6 hours | 700 rpm for 10 hours | Untreated SiO was employed |
| Ex. No. 2-4 | #24 | $2SiO + CaSi_2$ | 700 rpm for 50 hours | 900° C. for 6 hours | 700 rpm for 10 hours | Untreated SiO was employed |

(X-ray Diffraction Measurement)

Figure 6:
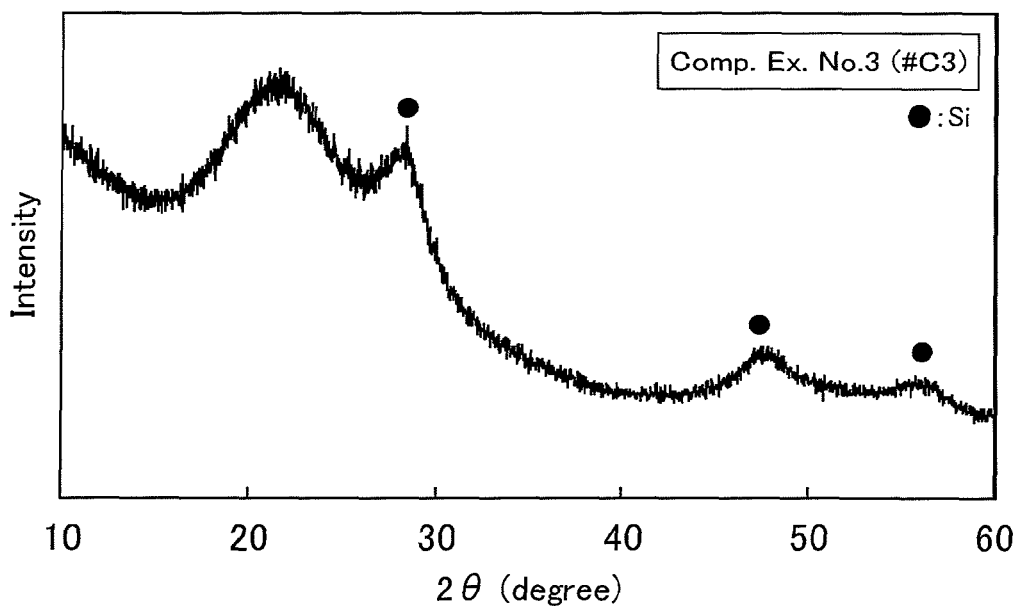
FIG. 6 is an X-ray diffraction diagram of a decomposed product that was obtained after causing silicon monoxide (SiO) to thermally decompose independently.
Figure 7:
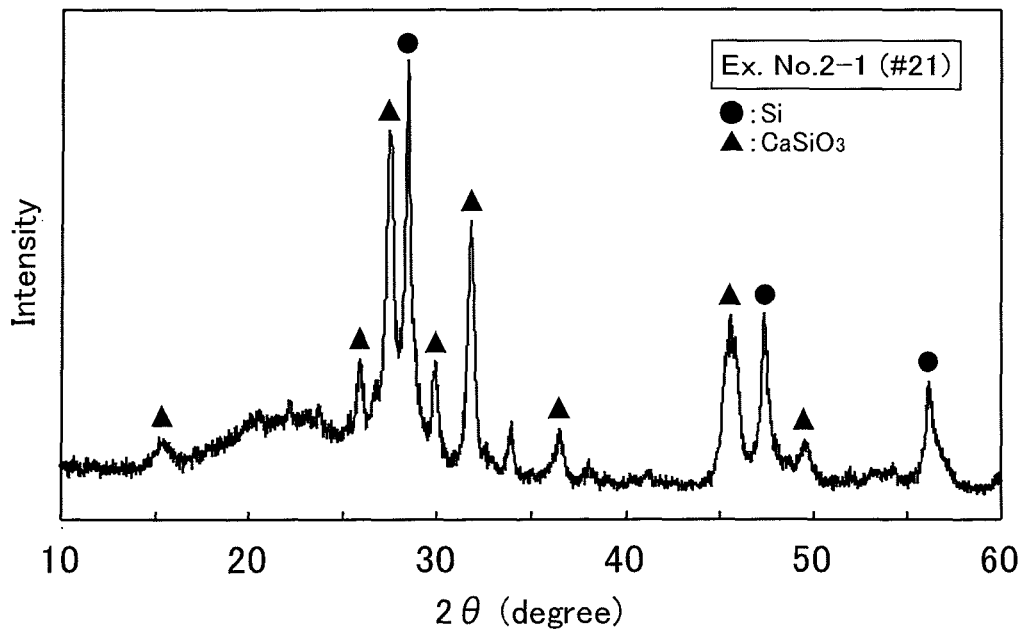
FIG. 7 is an X-ray diffraction diagram of a reaction product that was obtained by heat treating SiO and CaSi$_2$ at 900° C. for 2 hours after mixing them in a molar ratio of 3:1 and then subjecting them to milling.
Figure 8:
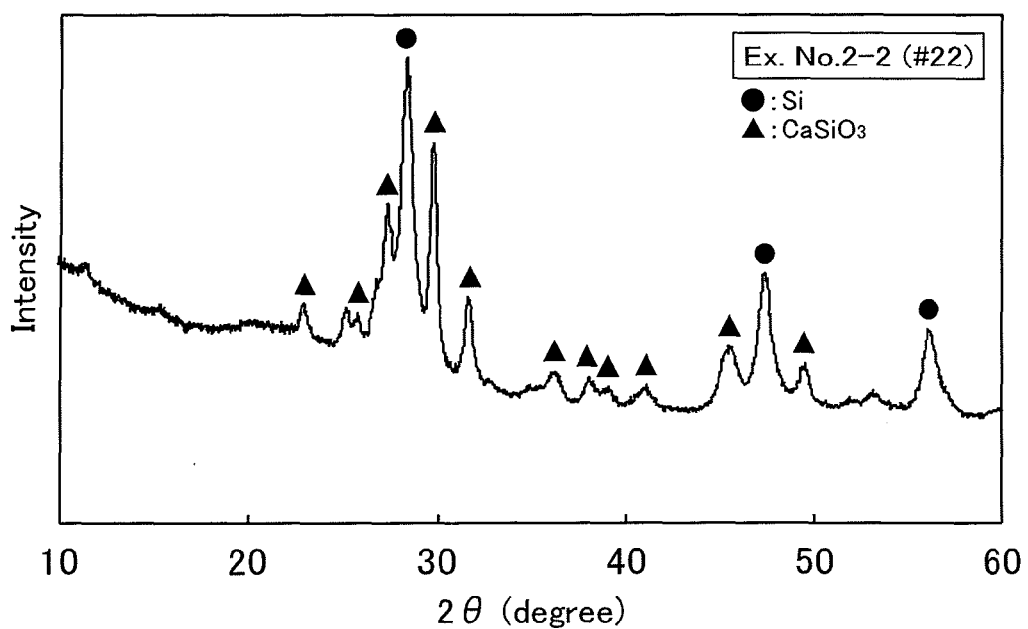
FIG. 8 is an X-ray diffraction diagram of a reaction product that was obtained by heat treating SiO and CaSi$_2$ at 900° C. for 6 hours after mixing them in a molar ratio of 3:1 and then subjecting them to milling.
Figure 9:
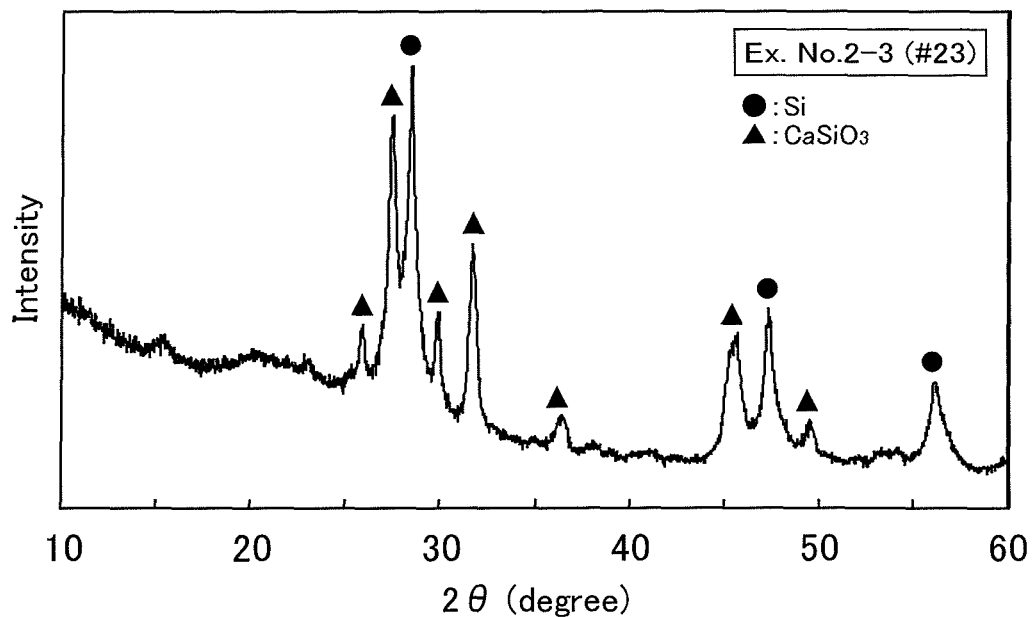
FIG. 9 is an X-ray diffraction diagram of a reaction product that was obtained by heat treating SiO and CaSi$_2$ at 900° C. for 6 hours after mixing them in a molar ratio of 4:1 and then subjecting them to milling.

For aforementioned Reaction Products #21 through 23 and #C3, an XRD measurement employing CuKα was carried out. The results are illustrated in FIG. 6 through FIG. 9. It was possible from #C3 to ascertain the diffraction peaks that indicated the presence of Si phase (FIG. 6). On the other hand, it was possible from #21 through 23 to ascertain the diffraction peaks that indicated the presence of $CaSiO_3$ phase together with the diffraction peaks that indicated the presence of Si phase (FIG. 7 through FIG. 9). In particular, when comparing the diffraction peaks of #23 (FIG. 9) with the diffraction peaks of #21 (FIG. 7) in which the reaction time, one of the reaction conditions, differed from that of the former, the diffraction peaks of #23 had wider widths than those of #21 did. This is believed to result from that a fine Si phase, and a fine $CaSiO_3$ phase were produced by making the reaction time longer.

Moreover, from the XRD measurement results, it is believed that the following reactions progressed in the respective examples.

Comparative Example No. 3

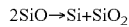

$2SiO \rightarrow Si + SiO_2$

Example Nos. 2-1 and 2-2

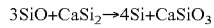

$3SiO + CaSi_2 \rightarrow 4Si + CaSiO_3$

Example No. 2-3

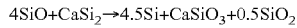

$4SiO + CaSi_2 \rightarrow 4.5Si + CaSiO_3 + 0.5SiO_2$

Moreover, although there is no XRD measurement result, it is assumed that the following reactions progressed in Example No. 2-4.

Example No. 2-4

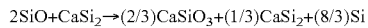

$2SiO + CaSi_2 \rightarrow (2/3)CaSiO_3 + (1/3)CaSi_2 + (8/3)Si$ (Manufacture II for Lithium Secondary Batteries)

Lithium secondary batteries were manufactured, lithium secondary batteries which are equipped with an electrode (i.e., a negative electrode) in which any one of aforementioned Reaction Products #21 through 24 and #C3 was used as a negative-electrode active material.

A mixed powder was obtained by mixing any of the reaction products (i.e., the negative-electrode active materials) with KETJENBLACK (or KB) serving as a conductive additive. Moreover, a polyamide-imide-silica hybrid resin serving as a binding agent was dissolved in N-methylpyrrolidone (or NMP). Note that the polyamide-imide-silica hybrid resin was produced by ARAKAWA CHEMICAL INDUSTRIES, LTD.; had a solvent composition of N,N-dimethylacetamide (or DMAc); had cured residuals in an amount of 15.1%; exhibited a viscosity of 5,100 mmPa·s at 25° C.; and had silica in an amount of 2% by weight in the cured residuals. This solution was mixed with a mixed power of the reaction product and KB, thereby preparing a slurry. A blending ratio between the negative-electrode active material, KB and the binding agent (the solid content) was 80:5:15 by mass ratio. The prepared slurry was coated onto a surface of an electrolytic copper foil (i.e., a current collector) with 18-μm thickness using a doctor blade, thereby forming a negative-electrode active-material layer on the copper foil. Thereafter, the negative-electrode active-material layer was dried at 80° C. for 20 minutes, thereby evaporating the NMP to remove it from the negative-electrode active material layer. After the drying, the current collector and the negative-electrode active-material layer were adhered closely and are then joined firmly by means of a roll pressing machine.

This one was heat cured at 350° C. for 10 minutes, thereby making it into an electrode whose active-material layer's thickness was 15 μm approximately.

While using the electrode being manufactured by the aforementioned procedure as an electrode to be evaluated, respectively, five kinds of Lithium Secondary Batteries "C3" and "B1" through "B4" were manufactured. Metallic lithium (with 500-μm thickness) was made into the counter electrode. The counter electrode was cut to ϕ13 mm, the electrode to be evaluated was cut to ϕ11 mm, and then a separator (e.g., CELGARD 2400, a glass filter produced by HOECHST CELANESE Corporation) was interposed between the two, thereby making an electrode-assembly battery. This electrode-assembly battery was accommodated in a battery case (e.g., CR2032, a coin cell produced by HOHSEN Co., Ltd.). Moreover, a non-aqueous electrolyte, in which $LiPF_6$ was dissolved in a concentration of 1 M into a mixed solvent in which ethylene carbonate and diethyl carbonate were mixed in a volumetric ratio of 1:1, was injected into the battery case. The battery case was sealed hermetically, thereby obtaining each of lithium secondary batteries (i.e., Battery "C3," and Batteries "B1" through "B4").

(Charging/Discharging Characteristics II on Lithium Secondary Batteries)
(Initial Charging/Discharging Efficiency)

A charging/discharging test was carried out with respect to five kinds of the thus manufactured lithium secondary batteries, thereby evaluating their charging/discharging characteristics. To begin with, their initial charging/discharging characteristics were evaluated. In the charging/discharging test, with regard to Batteries "C3" and "B1," the discharging operation was carried out up to a discharge cutoff voltage of 1.2 V with a constant current of 0.2 mA after the charging operation was carried out down to a charge cutoff voltage of 0.01 V with a constant current of 0.2 mA on the basis of metallic Li in a temperature environment of 25T2, thereby finding their initial charging/discharging efficiencies. With regard to Batteries "B2" through "B4," the discharging operation was carried out up to a discharge cutoff voltage of 2 V with a constant current of 0.05 mA after the charging operation was carried out on the basis of metallic Li down to a charge cutoff voltage of 0.01 V with a constant current of 0.05 mA on the basis of metallic Li, thereby finding their initial charging/discharging efficiencies. An "initial charging/discharging efficiency" is a value being found as a percentage value that is obtained by dividing an "initial discharged capacity" by an "initial charged capacity" (i.e., {(Initial Discharged Capacity)/(Initial Charged Capacity)}×100). Note the conditions of the charging/discharging test, the first-time discharged capacities, the first-time charged capacities, and the initial charging/discharging efficiencies are given in Table 5.

"B2" and "B3" whose initial efficiencies were high. A first charging/discharging test after the initial charging/discharging was labeled the first cycle, and the same charging/discharging operations as the initial one were repeated up to the fifth cycle. Subsequently, the charging/discharging operations were carried out repeatedly while setting the constant current at 0.1 mA from the sixth cycle to the tenth cycle; at 0.2 mA from the eleventh cycle to the fifteenth cycle; and at 0.05 mA from the sixteenth cycle to the twentieth cycle. The cutoff voltages of the charging and discharging were set at from 0.01 to 2 V in any of the cycles.

Figure 10:
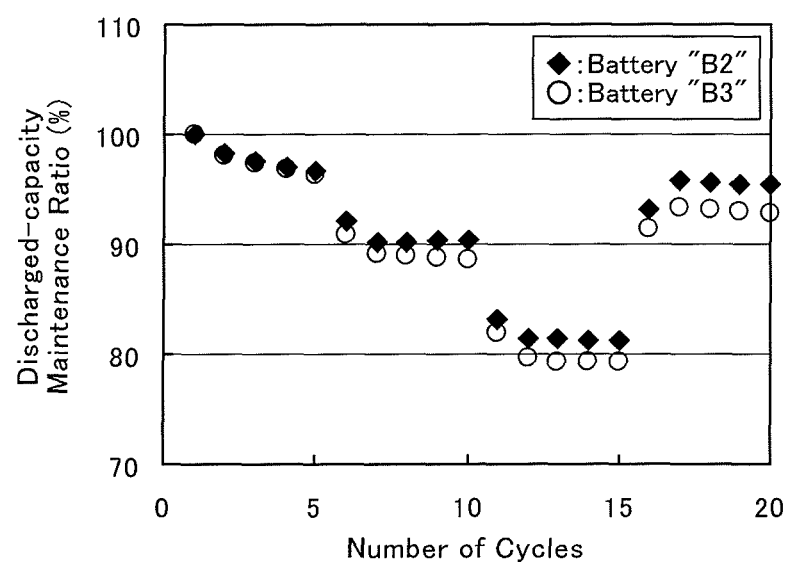
FIG. 10 is a graph that illustrates one of cyclabilities of lithium secondary batteries being equipped with negative electrodes that included other negative-electrode active materials for non-aqueous-system secondary battery according to the present invention, and shows their discharged-capacity maintenance ratios.
Figure 11:
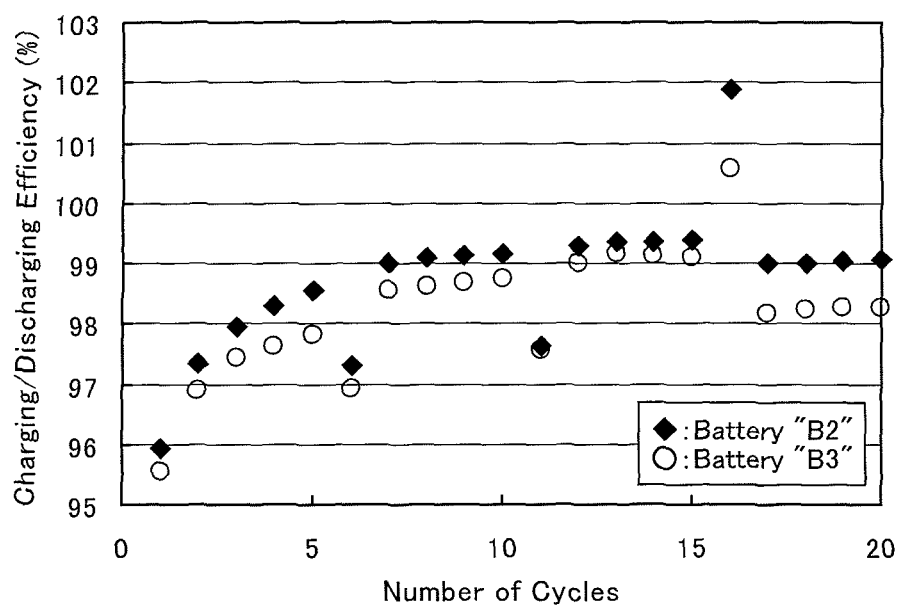
FIG. 11 is a graph that illustrates another one of cyclabilities of the lithium secondary batteries being equipped with the negative electrodes that included the other negative-electrode active materials for non-aqueous-system secondary battery according to the present invention, and shows their charging/discharging efficiencies.

At the respective cycles, their discharging capacities and charging capacities per a unit mass of the electrode active materials were measured with respect to the voltages. And, the discharged capacity maintenance ratios and charging/discharging efficiencies at the respective cycles are calculated. The results are illustrated in FIG. 10 and FIG. 11, respectively.

Note that a "discharged capacity maintenance ratio" is a value being found as a percentage value that is found by dividing a "discharged capacity at an Nth cycle" by a "discharged capacity at the 1st cycle" (i.e., {(Discharged Capacity at Nth Cycle)/(Discharged Capacity at 1st Cycle)}×100). Moreover, a "charging/discharging efficiency" is a value being found as a percentage value that is obtained by dividing a "discharged capacity at an Nth cycle" by a "charged capacity at the Nth cycle" (i.e., {(Discharged Capacity at Nth Cycle)/(Charged Capacity at Nth Cycle)}×100). "N" is an integer of from 1 to 20.

TABLE 5

| Lithium Secondary Battery | Negative-electrode Active Material | Current for Measurement (mA) | Potential (V) | Initial Charged Capacity (mAh/g) | Initial Discharged Capacity (mAh/g) | Charging/Discharging Initial Efficiency (%) |
|---|---|---|---|---|---|---|
| C3 | #C3 | 0.2 | 0.01-1.2 | 513.9 | 147.7 | 28.7 |
| B1 | #21 | 0.2 | 0.01-1.2 | 796.7 | 337.3 | 42.3 |
| B2 | #22 | 0.05 | 0.01-2 | 1251.9 | 889.8 | 71.1 |
| B3 | #23 | 0.05 | 0.01-2 | 1441.3 | 984.2 | 68.3 |
| B4 | #24 | 0.05 | 0.01-2 | 1373.7 | 970.0 | 70.6 |

The initial charging/discharging efficiency of Battery "C3" using #C3 as the negative-electrode active material was the lowest because of generated $SiO_2$ phase. It is believed that this results from that apart of Li ions are kept in a state of being occluded. On the other hand, in Battery "B1" using the negative-electrode active material labeled #21 that was produced using the raw-material powder including $CaSi_2$, the initial efficiency upgraded more than that of Battery "C3."

Battery "B2" through "B4" had undergone the charging/discharging test under the same conditions with each other. Of these, Battery "B2" using #22 as the negative-electrode active had the highest initial efficiency. It is believed that this results from that there was not any $SiO_2$ phase, a cause of the irreversible capacity, but only the Si phase and $CaSiO_3$ phase were present.

Moreover, Battery "B4" using #24 as the negative-electrode active material had an initial efficiency that was the same extent as those of Batteries "B2" and "B3." Consequently, it is believed that the negative-electrode active material labeled #24 also includes the Si phase and $CaSiO_3$ phase while the formation of $SiO_2$ phase is inhibited therein.

(Cyclability)

In order to evaluate their cyclabilities, the charging/discharging test was further carried out with respect to Batteries Any of the two batteries were one which satisfies the cyclability that has been required for lithium secondary battery.

The invention claimed is:

1. A production process for negative-electrode active material for non-aqueous-system secondary battery being characterized in that:
   it is a production process for the negative-electrode active material for non-aqueous-system secondary battery comprising a silicon phase as well as a metal silicate phase that includes at least one member of elements being selected from the group consisting of Group 2 (or Group 2A) elements in the Periodic Table; and
   it includes:
   a raw-material preparation step of preparing a mixed raw material at least including a silicon oxide, and a silicon compound; and
   a reaction step of reacting said mixed raw material,
   wherein said silicon oxide is $SiO_n$, where 0.1≤"n"≤2, and said silicon compound is a metal silicide that includes at least one member of elements being selected from the group consisting of Group 2 (or Group 2A) elements in the Periodic Table.

2. The production process for negative-electrode active material for non-aqueous-system secondary battery as set forth in claim 1, wherein:

said raw-material preparation step, and said reaction step include a milling step in which milling is performed in an inert atmosphere, thereby mixing a silicon-oxide-system powder, which contains said silicon oxide, with a silicon-compound-system powder, which includes said silicon compound, and at the same time compositing the silicon-oxide-system powder and the silicon-compound-system powder.

3. The production process for negative-electrode active material for non-aqueous-system secondary battery as set forth in claim 2, wherein said reaction step includes a heat treatment step being carried out after said milling step.

4. The production process for negative-electrode active material for non-aqueous-system secondary battery as set forth in claim 2 further including a disproportionation step of disproportionating silicon monoxide ($SiO_n$, where $0.5 \leq "n" \leq 1.5$) of a raw-material silicon oxide powder, which includes a silicon monoxide powder, into a silicon dioxide phase and a silicon phase, thereby obtaining said silicon-oxide-system powder.

5. The production process for negative-electrode active material for non-aqueous-system secondary battery as set forth in claim 1, wherein said mixed raw material includes said silicon oxide more than said silicon compound by molar ratio.

6. The production process for negative-electrode active material for non-aqueous-system secondary battery as set forth in claim 1, wherein said silicon oxide and said silicon compound possess compositions whose formation energy (or $\Delta H$) being found by means of first principle calculation becomes a negative value; and are mixed in a molar ratio by which the resulting $\Delta H$ becomes a negative value.

7. The production process for negative-electrode active material for non-aqueous-system secondary battery as set forth in claim 1, wherein said silicon compound includes at least one member of elements that is selected from the group consisting of magnesium (Mg), calcium (Ca), strontium (Sr) and barium (Ba).

8. The production process for negative-electrode active material for non-aqueous-system secondary battery as set forth in claim 1, wherein:
said silicon compound comprises Ca, and Si; and
a molar ratio between said silicon oxide and said silicon compound is from 1.5:1 to 8:1.

9. The production process for negative-electrode active material for non-aqueous-system secondary battery as set forth in claim 1, wherein said reaction step is a step of milling and/or heating said mixed raw material in order to react the mixed raw material.

* * * * *

UNITED STATES PATENT AND TRADEMARK OFFICE
CERTIFICATE OF CORRECTION

PATENT NO. : 9,184,439 B2
APPLICATION NO. : 13/516974
DATED : November 10, 2015
INVENTOR(S) : Manabu Miyoshi, Hideaki Ishikawa and Hitotoshi Murase It is certified that error appears in the above-identified patent and that said Letters Patent is hereby corrected as shown below:

On the title page:

Item (73) Assignee: delete "KABUSHIKI KAISHA TOYOTA JIDOSHA (IP)" and insert --KABUSHIKI KAISHA TOYOTA JIDOSHOKKI (JP)--

In the claims:

Column 22, Line 7: In Claim 6, delete "AH" and insert --$\Delta H$--

Signed and Sealed this
Twenty-fourth Day of May, 2016

Michelle K. Lee
*Director of the United States Patent and Trademark Office*